US012099551B2

(12) United States Patent
Eto et al.

(10) Patent No.: US 12,099,551 B2
(45) Date of Patent: Sep. 24, 2024

(54) INFORMATION SEARCH SYSTEM

(71) Applicant: JFE STEEL CORPORATION, Tokyo (JP)

(72) Inventors: Ayaka Eto, Tokyo (JP); Nobuyuki Morooka, Tokyo (JP); Akira Kariya, Tokyo (JP); Satoshi Kuwabara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/639,060

(22) PCT Filed: Sep. 8, 2020

(86) PCT No.: PCT/JP2020/033940
§ 371 (c)(1),
(2) Date: Feb. 28, 2022

(87) PCT Pub. No.: WO2021/065379
PCT Pub. Date: Apr. 8, 2021

(65) Prior Publication Data
US 2022/0327162 A1 Oct. 13, 2022

(30) Foreign Application Priority Data
Oct. 1, 2019 (JP) .................. 2019-181148

(51) Int. Cl.
*G06F 16/9032* (2019.01)
*G06F 16/903* (2019.01)
*G06F 16/906* (2019.01)

(52) U.S. Cl.
CPC .. *G06F 16/90324* (2019.01); *G06F 16/90335* (2019.01); *G06F 16/906* (2019.01)

(58) Field of Classification Search
CPC ............. G06F 16/90324; G06F 16/906; G06F 16/90335; G06F 16/242
(Continued)

(56) References Cited

U.S. PATENT DOCUMENTS 5,220,625 A * 6/1993 Hatakeyama ......... G06F 16/338
707/E17.082
7,809,714 B1 * 10/2010 Smith ................. G06F 16/2425
707/999.005
(Continued)

FOREIGN PATENT DOCUMENTS

EP    2 778 959 A1    9/2014
JP    2009-069973 A   4/2009
(Continued)

OTHER PUBLICATIONS

Dec. 8, 2020 International Search Report issued in International Patent Application No. PCT/JP2020/033940.
(Continued)

*Primary Examiner* — Shahid A Alam
(74) *Attorney, Agent, or Firm* — Oliff PLC

(57) ABSTRACT

An information search system includes: a database configured to store service support information; and an information management device configured to search for predetermined information from the service support information, the information management device including a processor configured to receive an input of a query including a keyword, from a searcher, receive an input of classification information to which a narrowing keyword belongs, present a narrowing keyword belonging to the input classification information and having a correlative relation with the keyword, in a selectable manner, and execute a searching process across the database, based on the input keyword and the selected narrowing keyword.

4 Claims, 8 Drawing Sheets

(58) Field of Classification Search
USPC .................................. 707/739, 734; 709/203
See application file for complete search history.

(56) References Cited

U.S. PATENT DOCUMENTS

| | | | | |
|---|---|---|---|---|
| 7,921,105 | B2* | 4/2011 | Toyoda | G06F 16/334 |
| | | | | 707/730 |
| 8,812,541 | B2* | 8/2014 | Ismalon | G06F 16/9535 |
| | | | | 707/765 |
| 9,626,439 | B2 | 4/2017 | Mathieu et al. | |
| 10,621,252 | B2 | 4/2020 | Mathieu et al. | |
| 2003/0050927 | A1* | 3/2003 | Hussam | G06F 16/34 |
| | | | | 707/999.005 |
| 2003/0163462 | A1* | 8/2003 | Kawamura | G06F 16/334 |
| 2006/0212441 | A1* | 9/2006 | Tang | G06F 16/951 |
| | | | | 707/999.005 |
| 2007/0050734 | A1* | 3/2007 | Busey | G06F 16/972 |
| | | | | 707/999.003 |
| 2007/0226208 | A1* | 9/2007 | Morita | G06F 16/30 |
| | | | | 707/999.005 |
| 2008/0077570 | A1* | 3/2008 | Tang | G06F 16/951 |
| | | | | 707/999.005 |
| 2008/0162115 | A1* | 7/2008 | Fuji | G06F 40/45 |
| | | | | 704/7 |
| 2009/0171918 | A1* | 7/2009 | Manber | G06Q 30/02 |
| 2009/0228442 | A1* | 9/2009 | Adams | G06F 16/951 |
| | | | | 707/999.102 |
| 2010/0070448 | A1* | 3/2010 | Omoigui | H01L 27/1463 |
| | | | | 706/55 |
| 2012/0179709 | A1 | 7/2012 | Nakano et al. | |
| 2014/0012840 | A1 | 1/2014 | Han et al. | |
| 2014/0358969 | A1 | 12/2014 | Mathieu et al. | |
| 2014/0372257 | A1 | 12/2014 | Nishioka | |
| 2015/0074102 | A1* | 3/2015 | Ismalon | G06F 16/242 |
| | | | | 707/734 |
| 2016/0154885 | A1 | 6/2016 | Mathieu et al. | |
| 2017/0185688 | A1 | 6/2017 | Mathieu et al. | |
| 2019/0392077 | A1* | 12/2019 | Kikuchi | G06F 16/3334 |

FOREIGN PATENT DOCUMENTS

| | | |
|---|---|---|
| JP | 2016-021217 A | 2/2016 |
| JP | 2019-121392 A | 7/2019 |
| RU | 110847 U1 | 11/2011 |
| RU | 2698405 C2 | 8/2019 |
| TW | I561999 B | 12/2016 |
| WO | 2014/002549 A1 | 1/2014 |

OTHER PUBLICATIONS

Sep. 5, 2022 Extended Search Report issued in European Patent Application No. 20870876.8.
Aug. 24, 2021 Office Action issued in Taiwanese Patent Application No. 109131592.
Sep. 27, 2022 Office Action issued in Russian Patent Application No. 2022105298/07.

* cited by examiner

FIG.2

| NAME OF STORAGE FOLDER | FILE NAME | CORRESPONDING INFORMATION TYPE | EXAMPLE |
|---|---|---|---|
| FAILURE REPORTS | YYMMDD_LINE_NAME_FAILURE NAME | FAILURE CASES | 180917_1CPL TENSION LEVELER MOTOR BRAKE OPEN ABNORMALITY.xls |
| WORK STANDARDS | STANDARD_OOO | MANUALS | PROCEDURE_AGING.xls |
| CREATION PROCEDURES | PROCEDURE_OOO | | |
| SAFETY DOCUMENTS | SAFETY_OOO | | |
| MAINTENANCE KNOW-HOWS | MANUFACTURER_LINE_FACILITY | MAINTENANCE KNOW-HOWS | MANUFACTURER A_xxx LINE_PCS6000 STATUS INDICATOR.xls |
| DRAWINGS | MANUFACTURER_LINE_FACILITY | DRAWINGS | MANUFACTURER A_xxx LINE_WELDER DEVELOPMENT VIEW.xls |
| MAINTENANCE LOGS | LINE_FACILITY | MAINTENANCE LOGS | xxx LINE_MOTOR MAINTENANCE LOG.xls |
| OPERATION STANDARDS | LINE_FACILITY | OPERATION STANDARD | xxx LINE_BUILDUP MATER HANDLINING STANDARD.xls |

FIG.3A

| | CLASSIFICATION | WORD(S) | CLASSIFICATION INFORMATION |
|---|---|---|---|
| 1 | LINES | zyx | D11 |
| | | ⋮ | ⋮ |
| 2 | FACILITIES | wvu | D21 |
| | | ⋮ | ⋮ |
| 3 | EQUIPMENT | tsr | D31 |
| | | ⋮ | ⋮ |
| 4 | PARTS | qpo | D41 |
| | | ⋮ | ⋮ |
| 5 | CONDITIONS | abc | D51 |
| | | ⋮ | ⋮ |
| 6 | CAUSES | nml | D61 |
| | | ⋮ | ⋮ |
| ⋮ | ⋮ | ⋮ | ⋮ |

FIG.3B

| | CLASSIFICATION | RULE |
|---|---|---|
| 1 | LINES | FOR EACH FACTORY |
| 2 | FACILITIES | MECHANICAL + ELECTRICAL PRODUCTS |
| 3 | EQUIPMENT | ELECTRICAL PRODUCTS |
| 4 | PARTS | PRODUCTS INOPERABLE BY ITSELF |
| 5 | CONDITIONS | WORDS DESCRIBING FAILURE |
| 6 | CAUSES | WORDS DESCRIBING FAILURE DO NOT REGISTER WORDS CLASSIFIED UNDER FACILITY AND EQUIPMENT |
| ⋮ | ⋮ | ⋮ |

FIG.4A

| TYPE | INFORMATION-TYPE DETERMINING KEYWORDS | | | | |
|---|---|---|---|---|---|
| A | FAILURE CASES | FAILURE | SIMILAR CASE | SOLUTION | ... |
| B | MANUALS | FAILURE TYPE | REPLACEMENT PROCEDURE | ... | ... |
| C | ... | ... | ... | ... | ... |
| D | ... | ... | ... | ... | ... |
| ... | ... | ... | ... | ... | ... |

FIG.4B

| | WORDS WITH SAME MEANING | | | | | WORDS WITH SIMILAR MEANINGS | | |
|---|---|---|---|---|---|---|---|---|
| 1 | AA FACILITY | OO FACILITY | A'A' FACILITY | A"A" | ... | aaa | a'a'a' | ... |
| 2 | XX EQUIPMENT | BB EQUIPMENT | B'B' GEAR | B"B" | ... | bbb | b'b'b' | ... |
| 3 | CC FAILURE | ERROR C'C' | C"C" | △△FAILURE | ... | ccc | c'c'c' | ... |
| 4 | DD PART | MODEL D'D' | □□PART | D"D" | ... | ddd | d'd'd' | ... |
| ... | ... | ... | ... | ... | ... | ... | ... | ... |

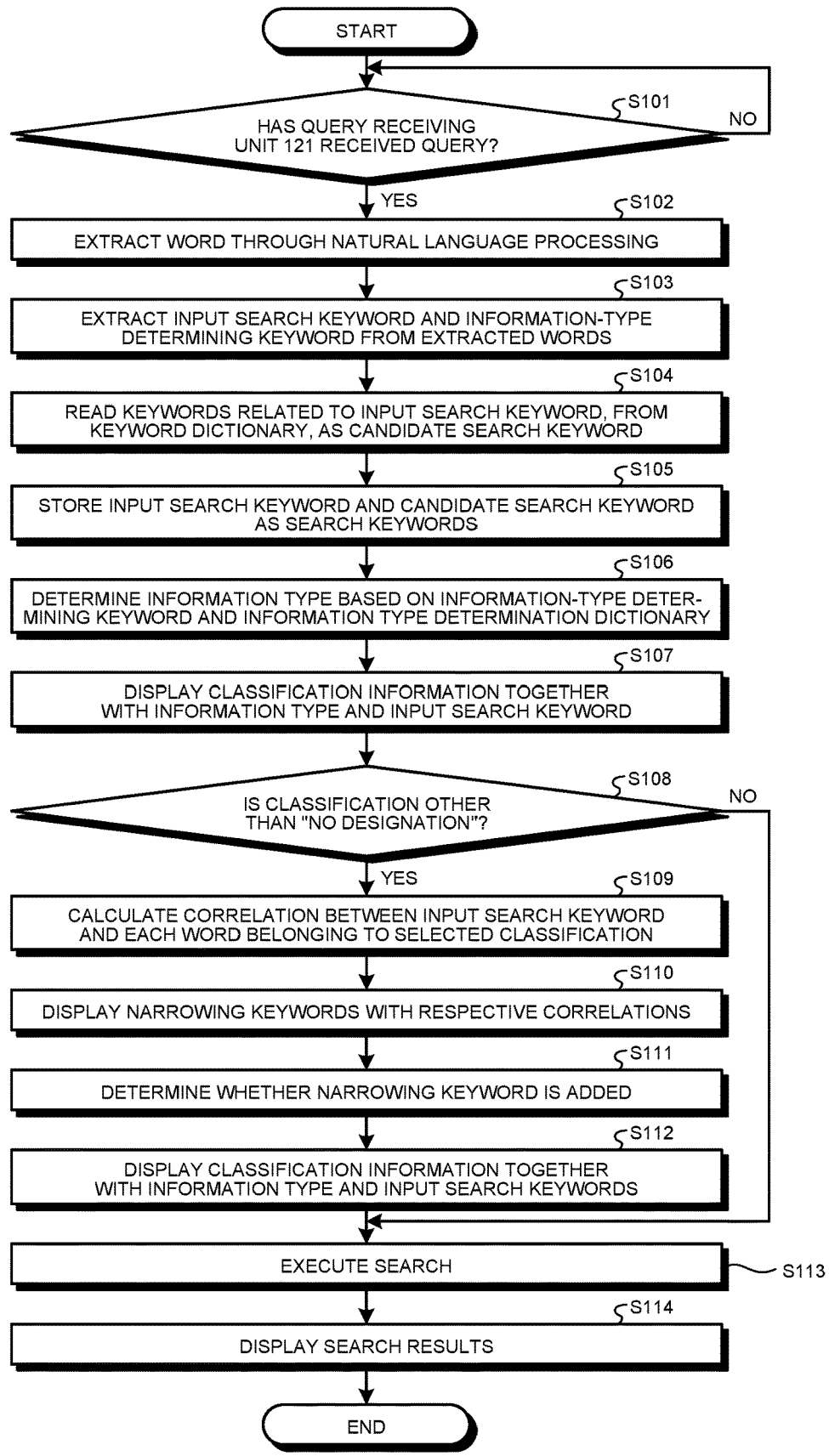

FIG.6C

FACILITY MAINTENANCE SERVICE INFORMATION SEARCH SYSTEM

INFORMATION TYPE

| FAILURE CASES | MANUALS | MAINTENANCE KNOW-HOWS |
| DRAWINGS | MAINTENANCE LOGS | OPERATION STANDARDS |

SEARCHED PERIOD

FROM YYYY/MM/DD TO YYYY/MM/DD

SEARCH KEYWORD

- ☑ AA FACILITY — OO FACILITY···
- ☑ BB EQUIPMENT — XX EQUIPMENT···

CLASSIF...

Dropdown: NO DESIGNATION / LINES / FACILITIES / EQUIPMENT / PARTS / CONDITIONS / CAUSES / ...

WORD REQUEST — 203

[SEARCH]

FIG.6D

FACILITY MAINTENANCE SERVICE INFORMATION SEARCH SYSTEM

| CONDITIONS | WORD(S) | CORRELATION |
|---|---|---|
| | abc | |
| | def | |
| | ghi | |
| | jkl | |
| | mno | |
| | pqr | |

[ADD TO KEYWORD]

FIG.6E

FACILITY MAINTENANCE SERVICE INFORMATION SEARCH SYSTEM

INFORMATION TYPE

| FAILURE CASES | MANUALS | MAINTENANCE KNOW-HOWS |
|---|---|---|
| DRAW-INGS | MAINTE-NANCE LOGS | OPERATION STANDARDS |

SEARCHED PERIOD

FROM YYYY/MM/DD TO YYYY/MM/DD

SEARCH KEYWORDS  [WORD REQUEST] — 203

☑ AA FACILITY  ☑ OO FACILITY···

☑ BB EQUIPMENT  ☑ XX EQUIPMENT···

CLASSIFICATION

[NO DESIG-NATION]

ADDED KEYWORD (NARROWING KEYWORD)

☑ abc                                      [SEARCH] — 202

FIG.6F

FACILITY MAINTENANCE SERVICE INFORMATION SEARCH SYSTEM

SEARCH RESULTS

DISPLAYING 10 OUT OF XXX RESULTS

☐ 061222_3CGL····trip.xls
OVERVIEW
················································
················································
USEFUL FOR SOLVING PROBLEMS  ★★★★☆ —401
APPLICATIONS TO RARE PROBLEMS ★★☆☆☆ —402

☐ 071101_2CGL····trip.xls
OVERVIEW
················································
················································
USEFUL FOR SOLVING PROBLEMS  ★★☆☆☆ —401
APPLICATIONS TO RARE PROBLEMS ★★★☆☆ —402

⋮

INFORMATION SEARCH SYSTEM

FIELD

The present invention relates to an information search system that is capable of searching for desirable information efficiently, from a database that stores therein service support information.

BACKGROUND

In order to search for desirable information from an enormous amount of service support information, one is required to enter an appropriate keyword to the information search system. However, because it is difficult for those who do not have enough knowledge or who are inexperienced to enter an appropriate keyword, they may face the problem that they cannot search any desirable information. Based on such a background, Patent Literature 1 discloses an information search system that is capable of searching for desirable information even when an inappropriate keyword is entered, by executing a search using words with similar meanings, in addition to the entered keyword.

CITATION LIST

Patent Literature

Patent Literature 1: Japanese Patent Application Laid-open No. 2019-121392

SUMMARY

Technical Problem

However, because the information search system according to Patent Literature 1 executes a search using an entered keyword as well as the words with similar meanings, depending on the entered keyword, the number of search results becomes enormous. As a result, even if some desirable information is included in the search results, it takes a long time to identify the desirable information by checking each result at a time from the enormous number of search results.

The present invention is made in consideration of the above-described problem, and an object of the present invention is to provide an information search system that is capable of identifying desirable information efficiently from an enormous amount of service support information.

Solution to Problem

An information search system according to the present invention includes: a database configured to store service support information; and an information management device configured to search for predetermined information from the service support information, the information management device including a query receiving unit configured to receive an input of a query including a keyword, from a searcher, a classification information receiving unit configured to receive an input of classification information to which a narrowing keyword belongs, a narrowing keyword presenting unit configured to present a narrowing keyword belonging to the input classification information and having a correlative relation with the keyword, in a selectable manner, and a search executing unit configured to execute a searching process, the search executing unit executes a searching process across the database, based on the input keyword and the selected narrowing keyword.

The service support information may be facility maintenance information, the narrowing keyword presented by the narrowing keyword presenting unit may be a keyword having a correlative relation with the keyword input to the query receiving unit in a facility maintenance service, and the narrowing keyword presenting unit may be configured to present two or more of the narrowing keywords, together with respective correlations.

The information search system may further include a storage unit configured to store classification definition information that defines to which one of a plurality of pieces of the classification information a specific narrowing keyword belongs.

Advantageous Effects of Invention

According to the present invention, it is possible to provide an information search system that is capable of identifying desirable information efficiently from the enormous amount of service support information.

BRIEF DESCRIPTION OF DRAWINGS

FIG. 2 is a schematic illustrating one example of rules for folder names and file names.

FIG. 3A is a schematic illustrating one example of classification information stored in a classification definition information storage unit.

FIG. 3B is a schematic illustrating one example of a system (definitions) for creating words belonging to classifications.

FIG. 4A is a schematic illustrating one example of an information-type determining keywords stored in an information type determination dictionary.

FIG. 4B is a schematic illustrating one example of keywords stored in a keyword dictionary.

FIG. 5 is a flowchart illustrating a sequence of an information searching process that is one embodiment of the present invention.

FIG. 6C is a schematic illustrating one example of a third screen displayed on the display device.

FIG. 6D is a schematic illustrating one example of a fourth screen displayed on the display device.

FIG. 6E is a schematic illustrating one example of a fifth screen displayed on the display device.

FIG. 6F is a schematic illustrating one example of a sixth screen displayed on the display device.

DESCRIPTION OF EMBODIMENTS

An information search system that is one embodiment of the present invention will now be explained. As an example of the service support information, facility maintenance service information in the manufacturing industry will be explained below. In the explanation below, the "facility maintenance service information" may be sometimes simply referred to as "information" or "data".

[Configuration]

Figure 1:
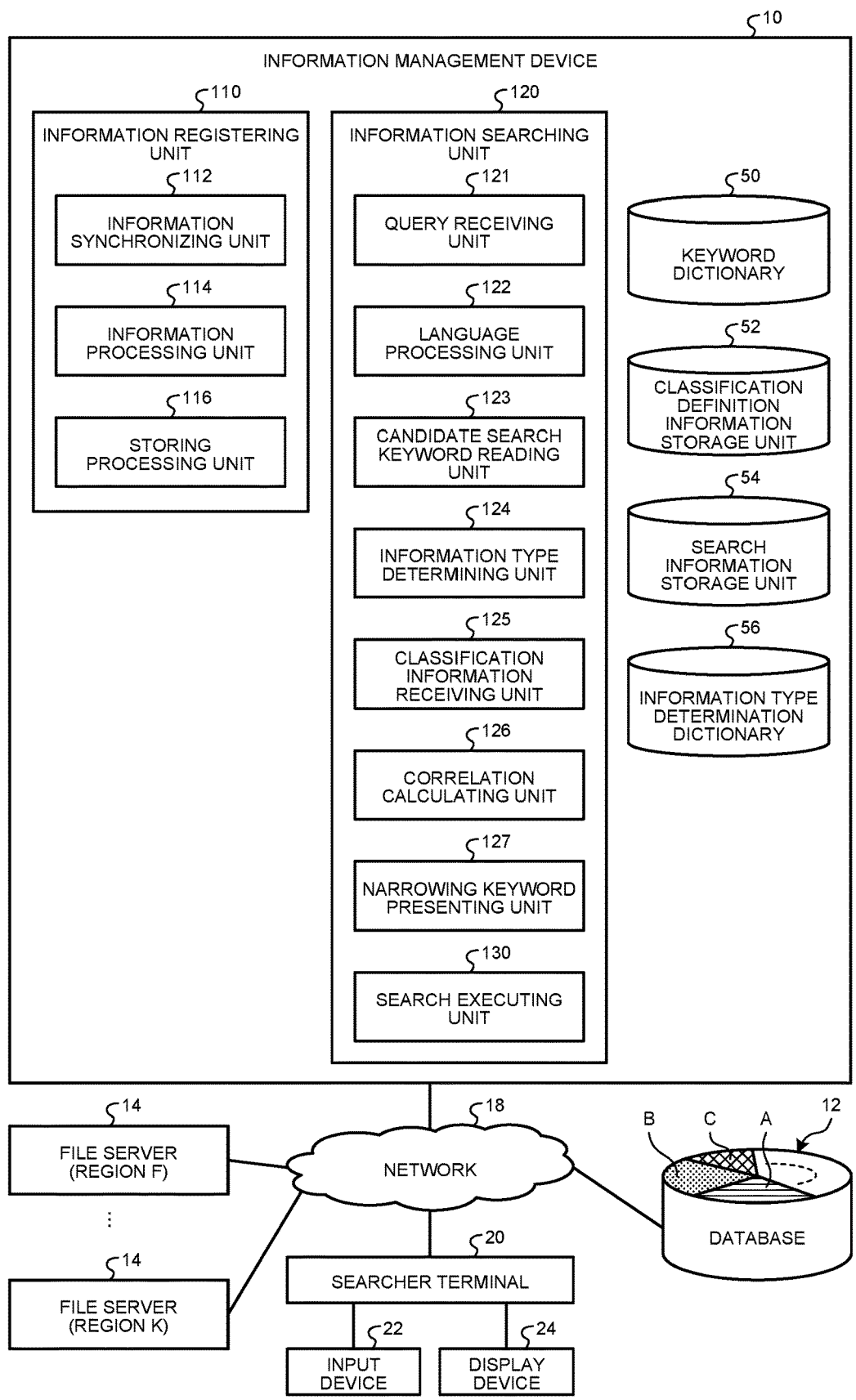
FIG. 1 is a block diagram illustrating a configuration of an information search system that is one embodiment of the present invention.

A configuration of an information search system that is one embodiment of the present invention will now be explained with reference to FIG. 1. FIG. 1 is a block diagram illustrating a configuration of an information search system that is one embodiment of the present invention. As illustrated in FIG. 1, the information search system that is one embodiment of the present invention includes an information management device 10 for managing information, a database 12 storing therein a plurality of pieces of facility maintenance service information to be searched, a plurality of file servers 14, and a searcher terminal 20. The information management device 10, the database 12, the file servers 14, and the searcher terminal 20 are connected to one another over a network 18.

The network 18 is a communication network such as a local area network (LAN) managed by an organization (company) to which a user belongs. However, the network 18 may also be a public communication network such as the Internet, or a communication network partly including a general public line, such as a wide area network (WAN) or a virtual private network (VAN).

Each of the information management device 10 and the searcher terminal 20 is implemented by a computer and a computer program. Examples of the searcher terminal 20 include a mobile terminal such as a smartphone, a personal computer, and a tablet computer. An input device 22, such as a keyboard or a mouse, and a display device 24, such as a display, are connected to or integrated with the searcher terminal 20.

Documents, such as reports and manual, drawings, and photographs stored in each of the file servers 14 are collected and stored in the database 12. The documents may be, not only documents originally made by entering texts, but also those created by converting voice into texts using a speech recognition engine, and those created by converting images of the texts on paper media into text data using an optical character reader (OCR). When drawings and photographs are stored, the drawings and the photographs are stored in a form allowing the characters embedded in the drawings or their file names to be searched. The information stored in the database 12 includes information such as work standards and manuals related to failures and problems of equipment or the like, and their causes and solutions. In the present embodiment, it is assumed that specific facilities are located in a plurality of regions (e.g., across a plurality of countries or prefectures), and that the file servers 14 are deployed in the respective regions.

The information management device 10 includes an information registering unit 110, an information searching unit 120, and various storage units (a keyword dictionary 50, a classification definition information storage unit 52, a search information storage unit 54, and an information type determination dictionary 56). In the present embodiment, to facilitate understanding, the configurations for implementing a registering function and a searching function will be explained as separate, as the information registering unit 110 and the information searching unit 120, respectively, but one configuration may be used to execute these two functions. The information registering unit 110 is configured to be able to execute the registering function, as mentioned above, and more specifically, a process for storing the information stored in the file servers 14 in the database 12. The information registering unit 110 includes an information synchronizing unit 112, an information processing unit 114, and a storing processing unit 116.

The information synchronizing unit 112 automatically executes synchronization of the information stored in the database 12 to the information stored in the file servers 14, on a regular or irregular basis. When there is a new piece of data stored in the file server 14 but not stored in the database 12, the information synchronizing unit 112 acquires the new piece of data over the network 18. The information processing unit 114 applies predetermined data processing to the data acquired by the information synchronizing unit 112. In the present embodiment, as the data processing, information type information is appended to the data. The information type information is information indicating an information type to which a document belongs. The information processing unit 114 identifies the information type based on any one or both of the folder where the document is stored in the file servers 14, and the file name of the data, for example. FIG. 2 is a schematic illustrating one example of rules for defining the name of the folders prepared in the file servers 14 and the file names of the data stored in the folders. When the information type is identified based on the folders, for example, the information processing unit 114 identifies, to refer to FIG. 2, the information type of the data stored in the folder "failure reports" as "failure cases"; identifies the information type of the data stored in the folders "work standards", "creation procedures", and "safety documents" as "manuals"; identifies the information type of the data stored in the folder "maintenance know-hows" as "maintenance know-hows"; identifies the information type of the data stored in the folder "drawings" as "drawings"; identifies the information type of the data stored in the folder "maintenance logs" as "maintenance log"; and identifies the information type of the data stored in the folder "operation standards" as "operation standards". When the information type is identified based on file names, as a result of a data creator creating a file name based on the file creation rules indicated in FIG. 2, the information processing unit 114 is enabled to identify that a piece of data belongs to the "failure cases", for example, based on its file name, although a step-by-step explanation is omitted herein.

As the data processing, the information processing unit 114 also assigns classification information to a piece of data based on classification information stored in the classification definition information storage unit 52. FIG. 3A is a schematic illustrating one example of the classification information stored in the classification definition information storage unit 52. As indicated in FIG. 3A, the classification information is defined based on the rules indicated in FIG. 3B to which one of a plurality of classifications a specific word belongs. FIG. 3A indicates that the word "abc" belongs to the classification "conditions", and is assigned with the classification information "D51", for example, and therefore, when a piece of acquired data contains the word "abc", the classification information "D51" assigned to the word "abc" is appended to the piece data. This assignment of the classification information may be omitted, but by performing this process, a correlation calculation performed by a correlation calculating unit 126, which will be described later, can be performed efficiently.

Referring back to FIG. 1, a storing processing unit 116 stores the data resultant of the data processing performed by the information processing unit 114, in the database 12. The storing processing unit 116 divides the pieces of data into the respective information types and stores the data in the database 12 (see FIG. 1). The data may be stored in the database 12 in a regular or irregular basis by the information registering unit 110, and also by a registrant via the searcher terminal 20, for example. When the data is registered directly by a registrant, the rules indicated FIG. 2 are displayed in the screen being operated by the registrant, on the display device 24 or the like of the searcher terminal 20. In this manner, the registrant can set an appropriate a file name to the data, before the data is stored in the database 12.

The information searching unit 120 searches for, and extracts a specific piece of facility maintenance information from the database 12, based on a search instruction from the searcher terminal 20. The information searching unit 120 includes a query receiving unit 121, a language processing unit 122, a candidate search keyword reading unit 123, an information type determining unit 124, a classification information receiving unit 125, a correlation calculating unit 126, a narrowing keyword presenting unit 127, and a search executing unit 130.

These functional blocks generally have functions to be described below. The query receiving unit 121 receives a query entered by a searcher via the input device 22 of the searcher terminal 20, over the network 18. An entry format of the query is not limited to a particular one, and one or more words or a text may be entered and a text in a natural language format may be used. For example, a query including a text such as "What is the solution to a failure occurred in BB equipment in an AA facility?" or a plurality of words delimited by a space, e.g., "AA equipment BB equipment" is entered from the searcher terminal 20.

The language processing unit 122 extracts a word (independent word) by applying language processing such as known morphological analysis to the query received by the query receiving unit 121. Specifically, the language processing unit 122 extracts input search keywords that are to be used in a later search, and an information-type determining keyword that is to be used in determining the information type representing the intention (purpose) of the search, from the entered query. For example, when the query text "What is the solution to a failure occurred in BB equipment in an AA facility?" is entered, as in the example mentioned above, the language processing unit 122 extracts "AA facility" and "BB equipment" as input search keywords. The language processing unit 122 also refers to the information type determination dictionary 56 (FIG. 4A), and extracts a word that matches a word registered in the information type determination dictionary 56, as the information-type determining keyword. In other words, in the above example, the language processing unit 122 extracts the terms "failure" and "solution" as the information-type determining keywords.

Next, the candidate search keyword reading unit 123 will be explained, but before that, the keyword dictionary 50 will now be explained. In the keyword dictionary 50, related keywords are registered and stored in advance, in a manner mapped to one another. In the present embodiment, in the keyword dictionary 50, keywords having the same meaning are registered in a manner mapped to one another. In the keyword dictionary 50, keywords having similar meanings are also registered in a manner mapped to one another. However, in the keyword dictionary 50, only the keywords having the same meaning may be registered, or only the keywords having similar meanings may be registered. Instead of or in addition to these keywords, keywords that are likely to be highly correlated with one another may be registered in advance, in a manner mapped to one another. The words registered in the keyword dictionary 50 can be added or deleted as appropriate.

FIG. 4B illustrates one example of the keywords registered in advance in the keyword dictionary 50. In FIG. 4B, the keywords belonging to the same row (horizontal row) are those related to one another, and are mapped to one another.

Every time the language processing unit 122 extracts an input search keyword, the candidate search keyword reading unit 123 refers to the keyword dictionary 50, and reads a keyword that is related to the input search keyword, as a candidate search keyword. According to the example above, when "AA facility" is the input search keyword, the candidate search keyword reading unit 123 performs a match search across the keyword dictionary 50 illustrated in FIG. 4B, and reads all of the keywords belonging to the row that includes the "AA facility" (the first row in FIG. 4B), or when a designation has been made (e.g., only words having the same meanings), reads the keywords matching the designation, as the candidate search keywords. In this example, "OO facility", "A'A' facility", and "A"A"" are read as words having the same meaning, and "aaa" and "a'a'a'" are read as words having similar meanings as the "AA facility". In the same manner, as for "BB equipment" in the example above, the candidate search keyword reading unit 123 refers to the second row in FIG. 4B, and reads the relevant keywords as the candidate search keywords.

The search information storage unit 54 stores therein the candidate search keywords acquired in the manner described above, and the information-type determining keywords, as the search keywords. The search information storage unit 54 stores therein the search keywords cumulatively, every time an additional query is entered, and additional search keywords are extracted.

The information type determining unit 124 determines an information type that the searcher intends to search for, based on the information-type determining keywords extracted from the query. The information type determining unit 124 refers to the information type determination dictionary 56 illustrated in FIG. 4A, and determines the information type across which a search will be carried out, based on the information-type determining keyword. In the information type determination dictionary 56, an information-type determining keyword expected to be extracted from queries and an information type corresponding thereto are registered in advance, in a manner mapped to each other. For example, in the information type determination dictionary 56, "failure cases" is registered for the information-type determining keywords "failure", "similar case", and "solution", as the information type, and "manuals" is registered for the information-type determining keywords "failure type" and "replacement procedure", as the information type, in a manner mapped to one another. Although not illustrated in FIG. 4A, for the information types "maintenance know-bows", "drawings", "maintenance log", and "operation standards" described above with reference to FIG. 2, the information-type determining keywords corresponding thereto are stored in the information type determination dictionary 56.

As described above, the information registering unit 110 (the storing processing unit 116 described above) classifies the information to be stored in the database 12 in advance, into a plurality of groups A, B, C, . . . based on the types corresponding to the information types. For example, in the example illustrated in FIG. 1, the information related to "failure cases" is stored in the group A corresponding to a first information type; the information related to "manuals" is stored in a group B corresponding to a second information type; and the information related to "drawings" is stored in a group C corresponding to a third information type. Hereinafter although not illustrated, the information related to "maintenance know-bows", the information related to "maintenance log", and the information related to "operation standards" are stored in a group D corresponding to a fourth information type, a group E corresponding to a fifth information type, and a group F corresponding to a sixth information type, respectively. When the information type determined by the information type determining unit 124 is not as intended by the searcher, the searcher can change the information type by making an operation. For example, in the example described above, the group A "failure cases" is initially assigned with the information-type determining keywords "failure" and "solution", as the information type, but by changing the information type to the "manuals", the searcher can search for the desirable information from the information belonging to the group B. When no information-type determining keyword is extracted from the entered query, the group A "failure cases" is assigned as an initial information type, so that the searcher can change the information type as appropriate.

The classification information receiving unit 125 displays the classification to which a narrowing keyword belongs, in a selectable manner. In the example described above, a search will be carried out across the information belonging to the group A "failure cases", using "AA facility" and "BB equipment" (including the words with the same meaning and those with similar meanings) as the search keywords, but the number of the search results may become enormous. To reduce the number of search results, it is necessary to use an additional keyword. The classification information receiving unit 125, and the correlation calculating unit 126 and a narrowing keyword displaying unit, which will be described later, serve the function of assisting the searcher to add a narrowing keyword.

The classification information receiving unit 125 displays the classifications in a selectable manner. In the present embodiment, one of a plurality of classifications including "lines", "facilities", "equipment", "parts", "conditions", and "causes" is displayed in a selectable manner, e.g., as a pull-down menu (for example, see FIG. 6C). The number of classifications is configured so that they can be added or changed, as appropriate.

The correlation calculating unit 126 calculates a correlation between a search keyword and each word belonging to the classification selected by the searcher on the classification information receiving unit 125. In this example, the correlation is calculated based on frequencies at which the search keyword and a word belonging to the classification appear simultaneously in the same report or the same manual, or based on the number of times the search keyword and the word belonging to the classification are paired as search keywords stored in the search information storage unit 54. When there are a plurality of search keywords, the correlation is calculated for some or all of the search keywords, based on a selection made by the searcher.

The narrowing keyword presenting unit 127 presents each word belonging to the classification selected by the searcher in the classification information receiving unit 125 together with the correlation calculated by the correlation calculating unit 126, to the searcher, in a selectable manner (for example, see FIG. 6D). The searcher can then select one or more narrowing keywords by referring to the correlations. When a specific narrowing keyword is selected by the searcher, the selected narrowing keyword is stored additionally in the search information storage unit 54, as a search keyword.

The search executing unit 130 carries out a text-based match search across the information stored in the database 12, using the search keywords stored in the search information storage unit 54 (including the input search keyword extracted by the language processing unit 122, and the narrowing keyword selected by the searcher in the narrowing keyword presenting unit 127). In the present embodiment, the search executing unit 130 carries out a text-based match search with the search keywords described above, across the information among the groups A, B, C, . . . in the database 12, the group being a group corresponding to the information type determined by the information type determining unit 124.

[Information Searching Process]

Figures 6A, 6B:
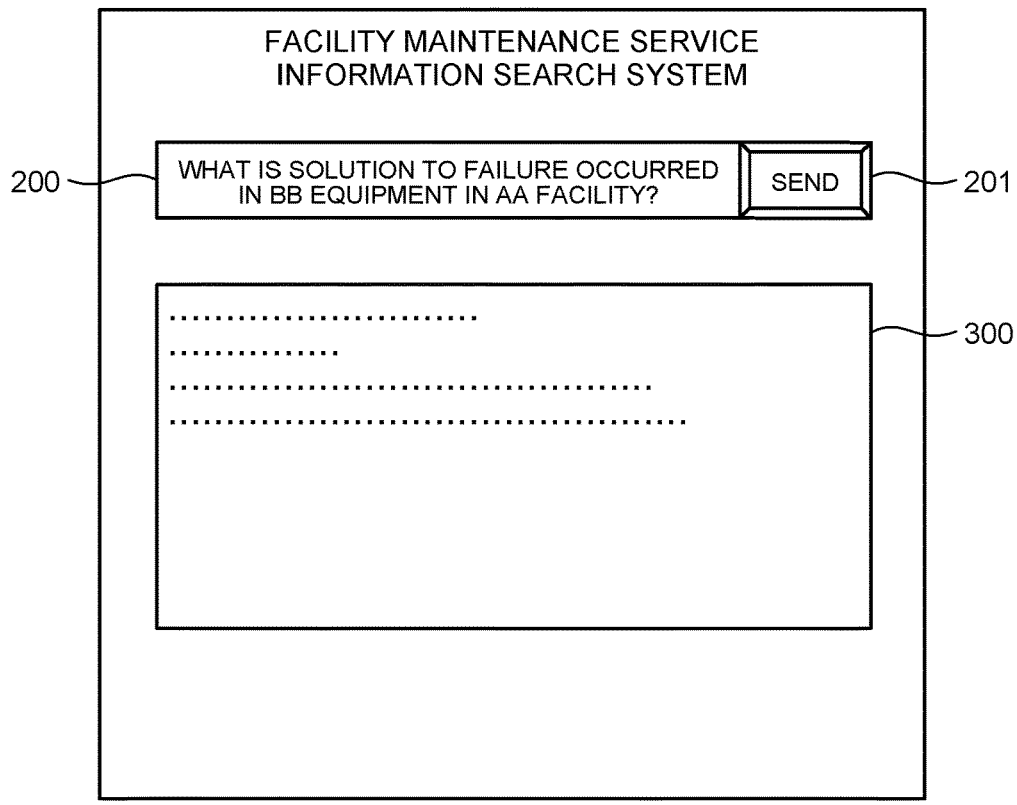
FIG. 6A is a schematic illustrating one example of a first screen displayed on a display device.
FIG. 6B is a schematic illustrating one example of a second screen displayed on the display device.

Next, an operation of the information search system, at the time when the information searching unit 120 executes the information searching process, will now be explained with reference to FIGS. 5 and 6A to 6F. FIG. 5 is a flowchart illustrating the sequence of the information searching process that is one embodiment of the present invention. FIG. 6A to 6F give some examples of screens displayed on the display device 24 of the searcher terminal 20, the screens being an example of application screens for using information search system according to the present invention. The flowchart illustrated in FIG. 5 is started when the searcher starts the above application on the searcher terminal 20, for example. At Step S101, it is determined whether the query receiving unit 121 has received a query, and if a query has been received (Y at S101), the system control goes to Step S102. When the searcher starts the application, the screen illustrated in FIG. 6A is displayed on the display device 24, for example. The searcher can then enter a query in a search space 200 via the input device 22. When the searcher enters a query in the search space 200, and selects (e.g., clicks on) a send icon 201, the query receiving unit 121 receives the query. Explained now is an example in which the query receiving unit 121 receives a query text "What is the solution to a failure occurred in BB equipment in an AA facility?". A history display area 300 is provided at the bottom of the screen, and is configured to enable copying of all or some of the queries entered in the search space 200 in the past, so that some range can be selected and copied from the past queries, and pasted in the search space 200.

The language processing unit 122 then extracts a words (independent words) by performing natural language processing such as morphological analysis to the query text received by the query receiving unit 121 (Step S102). In this example, "AA facility", "BB equipment", "failure", and "solution" are extracted from the query text, "What is the solution to a failure occurred in BB equipment in an AA facility?"

The language processing unit 122 then extracts (selects) the input search keywords and extracts (selects) the information-type determining keyword, from the words extracted as result of the language processing (Step S103). In this example, the language processing unit 122 extracts "AA facility" and "BB equipment" as the input search keywords, refers to the information type determination dictionary 56, and extracts (selects) "failure" and "solution" included in the information type determination dictionary 56, as the information-type determining keywords.

The candidate search keyword reading unit 123 then refers to the keyword dictionary 50, and reads the keywords related to the input search keywords, as the candidate search keywords (Step S104). In this example, the candidate search keyword reading unit 123 refers to the keyword dictionary 50 illustrated in FIG. 4B, and reads the words with the same meaning and those with similar meanings in the first row to which the "AA facility", which is an input search keyword extracted by the process at Step S103, belongs, and the words with the same meaning and those with similar meanings included in the second row to which the "BB equipment" belongs, as the candidate search keywords.

The input search keywords and the candidate search keywords read by the candidate search keyword reading unit 123 are then stored in the search information storage unit 54 (Step S105). In this example, "AA facility", "BB equipment", and the words with the same meaning and the words with similar meaning as the keywords are stored in the search information storage unit 54.

The information type determining unit 124 then determines the information type (intention of the search), based on the information-type determining keywords extracted at Step S103 and the information type determination dictionary 56 illustrated in FIG. 4A (Step S106). In this example, "failure" and "solution" are extracted as the information-type determining keywords, and therefore, the information type determining unit 124 refers to the information type determination dictionary 56, and determines "failure cases", to which the "failure" and the "solution" are mapped, as the information type.

The information searching unit 120 then displays classification information, as well as a searched period, and the information type and the input search keywords extracted and determined at the corresponding steps described above, on the display device 24, as indicated in FIG. 6B, for example, via the searcher terminal 20 (Step S107). On the display device 24, the information type, the input search keywords, and the classification information are displayed in a manner enabled to be selected and deleted, so as to allow a change to be made by the searcher, as required. For example, when the information type is to be changed, the information type can be changed by selecting another type using the input device 22. As the searched period, it is possible to set any period, and, when there is no designation of the period, it is possible to execute a search across the entire period. A search keyword can be excluded from the words to be used in a search, by removing a check from the checkbox positioned at the head of each keyword. In the display area for the search keywords, a word request icon 203 is displayed in a selectable manner, so that it is possible to request an addition of another keyword similar to the keywords displayed as the search keywords, or a deletion of an inappropriate keyword from those displayed as the search keywords. The keyword for which an addition or a deletion is requested may be added or deleted when the number of requests for an addition or a deletion reaches a predetermined number, or may be added or deleted as appropriate by a system administrator who receives the request for the addition or the deletion. Although "no designation" is selected for the classification information in the initial state, for example, as illustrated in FIG. 6B, it is configured to display a pull-down menu so that a desirable classification can be selected, as illustrated in FIG. 6C, by making an operation in this section using the input device 22. Explained now herein is an example in which no change is made in the information type and the input search keywords, but the classification information is changed from "no designation" to "conditions", in FIG. 6B.

When the classification information is changed from "no designation" to another classification at Step S107, that is, when the classification information receiving unit 125 receives a classification other than "no designation" (Step Y at S108), the system control goes to Step S109. If the classification information is no designation (Step N at S108), the system control goes to Step S113. At Step S109, the correlation calculating unit 126 calculates the correlation between the search keyword selected by the searcher at Step S107, and each of the words belonging to the classification received by the classification information receiving unit 125. In this example, the correlation calculating unit 126 calculates the correlation between both of the keywords "AA facility" and "BB equipment", and each one of the words belonging to the classification "conditions".

The narrowing keyword presenting unit 127 displays the correlations calculated at Step S109, together with the corresponding words belonging to the classification received by the classification information receiving unit 125, as the narrowing keywords, as illustrated in FIG. 6D, for example, on the display device 24 via the searcher terminal 20 (Step S110). The searcher can add one or more narrowing keywords that are considered appropriate, among those displayed on the display device 24, to the search keywords. In the explanation herein, it is now assumed that the word "abc", illustrated in FIG. 6D, is added as a narrowing keyword. The mode in which the correlation is displayed is not limited to a particular mode, and may be displayed using some shapes (graphs), as illustrated in FIG. 6D, or as numbers, as an example of another display mode.

At Step S112, depending on whether the narrowing keyword has been added at Step S110 (Step S111), the information searching unit 120 displays the information type, the input search keywords, and the classification information that are extracted, determined, or selected by the searcher at the respective steps described above, on the display device 24, via the searcher terminal 20. Specifically, if one or more narrowing keywords are added to the keywords at Step S110, a screen allowing the added narrowing keywords to be recognized, as illustrated in FIG. 6E, is displayed, and if no narrowing keyword is added to the keyword, the screen illustrated in FIG. 6B is displayed.

In response to a selection of a search icon 202 (see FIG. 6B or 6E) in the screen displayed on the display device 24, the search executing unit 130 executes a searching process across the information stored in the database 12. Specifically, the search executing unit 130 executes a text-based match searching process across the information belonging to the group corresponding to the selected information type, among the information stored in the database 12, based on the input search keyword from the query entered by the searcher, and also based on the narrowing keyword, if there is any narrowing keyword that has been added (Step S113). At this time, when the information type is drawings, the search executing unit 130 executes a search across any one or both of the file names given to drawings and the text information embedded as text data in the drawings. Finally, the information searching unit 120 displays the search results on the display device 24 of the searcher, as illustrated in FIG. 6F (Step S114).

In the search result screen illustrated in FIG. 6F, when there are matches with a plurality of pieces of information (documents) as a result of the search, the pieces of information are displayed following a predetermined rule (e.g., from those stored on more recent dates). However, pieces of information appended with predetermined rating information are displayed at higher priorities in preference to the predetermined rule. As an example of the predetermined rating information, the number of stars given to "useful for solving problems" and "applications to rare problems" are illustrated in FIG. 6F. This rating information can be given by the searcher, and the rating information can be given by selecting the number of stars at their respective positions (in FIG. 6F, any of the five stars). In the example illustrated in FIG. 6F, "4" stars are given to the item "useful for solving problems", and "2" stars are given to the item "applications to rare problems", in the information displayed at the top. In the information displayed at the second from the top, "2" stars is given to the item "useful for solving problems", and "3" stars are given to the item "applications to rare problems". When the number is greater, the information is more highly rated, that is, the information is more useful. In the present embodiment, although two items ("useful for solving problems" and "applications to rare problems") are illustrated as the rating information, the rating information may be one of these two, or may include three or more items. When there are a plurality of items of the rating information, the order in which the information is displayed may be determined based on one of the items included in the rating information, or all of the items included in the rating information (e.g., the total number of stars given to these items).

According to the present invention, because the input search keyword is extracted from the query entered by the searcher, and the narrowing keyword is presented together with the correlation based on the input search keyword and the classification of the narrowing keywords, it is possible even for those who do not have enough knowledge or who are inexperienced to select an appropriate keyword as the narrowing keyword. Then, the data required by the searcher can accurately extracted from the database, based on the input search keyword and the narrowing keyword, and thus, the search can be executed efficiently. In this manner, when a failure or a problem occurs, the searcher can search for information that can be used as a reference, such as a past case, efficiently, from the database by entering the condition as a text. Therefore, the searcher can quickly perform a recovering operation for the facility failure, based on the searched information.

Explained in the embodiment above is an example of an information search system for facility maintenance service information in the manufacturing industry, but the present invention is not limited to thereto, and may be applied to a search system for question-and-answer (Q&A) information as general, such as a system for searching for information indicating a treatment depending on the conditions of the disease or the name of a disease, or a system for searching for information indicating the name of errors displayed on machinery, such as an automobile or the solution suitable to a condition.

Explained in the embodiment above is an example in which data is stored in groups corresponding to the respective information types in the database 12, and a search is carried out based on the information type, as well as the input search keyword and the narrowing keyword, but it is also possible not to group the data correspondingly to the information types, or not to use the information type as a reference in the search. According to the present embodiment, as described above, it is possible to use the narrowing keyword as well as the input search keyword, and therefore, it is possible to search for and extract desirable information efficiently, without executing a search based on the information type.

In FIG. 6A, it is assumed that the past queries entered by the searcher are displayed in the history display area 300. The predetermined number of the past queries is displayed depending on the size of the history display area 300. Therefore, the queries may be configured to be downloadable as a log separately, when the searcher wants to identify the past queries that are not displayed in the history display area 300. The log may be downloadable from a predetermined setting screen (e.g., a setting screen for searcher information or the like, which is not illustrated), for example, and the searcher can acquire a piece of log data of his/her own search behaviors (the behaviors of his/her own, as well as those of others when a searcher is an administrator who has a system administrator privilege) over some time period. The log data contains various operations performed by the searcher, that is, search conditions (such as queries, searched periods, and added narrowing keywords), information of viewed data, information of operations for giving a rating, and the like.

One embodiment that is one application of the present invention made by the inventors has been explained above, but the present invention is not limited to the descriptions and the drawings making up the disclosure by the embodiment of the present invention. In other words, other embodiments, examples, and operation technologies, and the like made by those skilled in the art on the basis of the embodiment all fall within the scope of the present invention.

INDUSTRIAL APPLICABILITY

According to the present invention, it is possible to provide an information search system that is capable of identifying desirable information efficiently, from an enormous amount of service support information.

REFERENCE SIGNS LIST

10 information management device
12 database
14 file servers
18 network
20 searcher terminal
22 input device
24 display device
50 keyword dictionary
52 classification definition information storage unit
54 search information storage unit
56 information type determination dictionary
110 information registering unit
112 information synchronizing unit
114 information processing unit
116 storing processing unit
120 information searching unit
121 query receiving unit
122 language processing unit
123 candidate search keyword reading unit
124 information type determining unit
125 classification information receiving unit
126 correlation calculating unit
127 narrowing keyword presenting unit
130 search executing unit

The invention claimed is:
1. An information search system comprising:
a database configured to store facility maintenance information; and
an information management device configured to search for predetermined information from the facility maintenance information, the information management device including a processor configured to:
receive an input of a query including a keyword in a facility maintenance service, from a searcher,
receive an input of classification information to which a narrowing keyword belongs, wherein the classifi- cation information is defaulted to having no designation prior to receiving the input of the classification information, extract, based on the input of the classification information, at least two narrowing keywords belonging to the input classification information, for each narrowing keyword, perform a correlative relation calculation to calculate a correlative relation between the narrowing keyword and the input keyword, present the at least two narrowing keywords, together with the respective correlative relations, in a selectable manner, receive selection of one or more of the at least two narrowing keywords, and execute a searching process across the database, based on the input keyword and the selected one or more of the at least two narrowing keywords, wherein the correlative relation calculation is based on the number of times the input keyword and each narrowing keyword are paired in the searching process, and the processor is configured to perform the correlative relation calculation each time the classification information is changed via the input of the classification information.

2. The information search system according to claim 1, further comprising a memory configured to store classification definition information that defines to which one of a plurality of pieces of the classification information a specific narrowing keyword belongs.

3. The information search system according to claim 1, further comprising:

a display device, wherein the processor is further configured to control the display device to display the at least two narrowing keywords, together with the respective correlative relations, in a selectable manner.

4. The information search system according to claim 3, wherein the processor is further configured to control the display device to display results of the search process in order of preference according to a predetermined rule.

\* \* \* \* \*